United States Patent [19]

Fries et al.

[11] Patent Number: 5,008,808
[45] Date of Patent: Apr. 16, 1991

[54] CONSOLIDATION OF COMMANDS IN A BUFFERED INPUT/OUTPUT DEVICE

[75] Inventors: William J. Fries, Merritt Island; Donald Kleinschnitz; T. Craig Nelson, both of Melbourne, all of Fla.

[73] Assignee: Storage Technology Corporation, Louisville, Colo.

[21] Appl. No.: 210,719

[22] Filed: Jun. 23, 1988

[51] Int. Cl.$^5$ .......................... G06F 9/318; G06F 3/12
[52] U.S. Cl. .................................... 364/200; 364/235; 364/239.7; 364/261.1; 364/262.5
[58] Field of Search ................ 364/200 MS File, 200, 364/300, 900, 519

[56] References Cited

U.S. PATENT DOCUMENTS

| | | | |
|---|---|---|---|
| 3,988,719 | 10/1976 | Whitby et al. | 340/172.5 |
| 4,186,438 | 1/1980 | Benson et al. | 364/200 |
| 4,224,664 | 9/1980 | Trinchieri | 364/200 |
| 4,262,332 | 4/1981 | Bass et al. | 364/200 |
| 4,369,494 | 1/1983 | Bienvenu et al. | 364/200 |
| 4,394,725 | 7/1983 | Bienvenu et al. | 364/200 |
| 4,604,686 | 8/1986 | Reiter et al. | 364/200 |
| 4,636,946 | 1/1987 | Hartung et al. | 364/200 |
| 4,866,712 | 9/1989 | Chao | 371/5.5 |
| 4,901,232 | 2/1990 | Harrington et al. | 364/200 |

Primary Examiner—Thomas C. Lee
Attorney, Agent, or Firm—Dorr, Carson, Sloan & Peterson

[57] ABSTRACT

In a data processing system which includes a host computer connected by a channel interface unit through an input/output interface and control unit to an input/output device, commands and data associated with the commands are received in a buffer and first checked to determine whether the command has any pertinent data. If such check reveals that there is no pertinent data associated with a given command, that command is changed to an immediate command. Otherwise, the command is given a pointer in the buffer which prioritizes the order in which it will be carried out. Where a command is determined to have no pertinent data associated with such command, and a previously buffered command still in the buffer has pertinent data associated therewith, consolidation of the command immediate with the previously buffered command is carried out in order to improve efficiency of the input/output device.

7 Claims, 5 Drawing Sheets

CONSOLIDATION OF COMMANDS IN A BUFFERED INPUT/OUTPUT DEVICE

FIELD OF THE INVENTION

This invention relates to buffered input/output devices that are attached to a host computer, and more particularly to the consolidation of commands received by a buffered input/output device, such as a high-speed impact printer, from the host computer to which it is attached.

PROBLEM

It is well known that input/output devices may be used to provide external data storage for a data processing system, to communicate between two or more data processing systems, and to communicate between a data processing system and the outside world. High-speed impact printers are one example of input/output devices that are used in data processing systems for communication between the data processing system and the outside world.

Data processing systems typically include a main memory, or more control units, each of which provide the logical capability necessary to operate and control input/output devices, and one or more channels directing the flow of information between the control units and memory. Each control unit may be housed separately or it may be physically and logically integrated within an associated input/output device. The control unit adapts the characteristics of the associated input/output device to the standard form of control provided by the channel that interconnects the input/output device with the host computer.

An input/output device that is attached to a control unit is typically designed to perform a predefined function, such as recording data on a moving recording medium, such as magnetic tape, magnetic disks, optical disks, or paper as in the high-speed impact printer noted above. Regardless of the design, the input/output device needs detailed signal sequences peculiar to that type of input/output device in order to accomplish its designated function. Accordingly, the control unit decodes commands received from the host computer through the channel, interprets them for the input/output device, and provides the signal sequence for executing the operation.

Because of the great differences of operational speeds that exist between typical host computers and input/output devices, such input/output devices are most often provided with a buffer in order to temporarily store the data and commands which are input thereto from the host computer. The data and command stored in the buffer usually enter and exit the buffer on a "first-in-first-out" basis and such input/output devices are generally referred to as "buffered input/output devices".

One problem that exists with a buffered input/output device is a lack of operational efficiency. The data and commands received from the host computer by the buffer within the buffered input/output device exit the buffer in the very same order that they enter. If a particular command in a sequence of commands would be carried out more efficiently out of order, conventionally buffered input/output devices are unable to detect the potential for such increase in efficiency and are unable to rearrange the sequence of commands in order to carry out the more efficient operation.

SOLUTION

The above described problems are solved and a technical advance achieved in the field by the command consolidation apparatus of the present invention. This apparatus operates in a data processing system which includes a host computer connected by a channel interface unit through an input/output interface and control unit to an input/output device. A buffer is contained within the input/output device for storing data and commands received from the host computer In the preferred embodiment of this invention, the input/output device comprises a high-speed impact printer. Each command and any data associated with the command is first checked to determine whether the command has any pertinent data If such check reveals that there is pertinent data associated with a given command the command is given a pointer and stored in the buffer, which pointer prioritizes the order in which the command is executed.

If a given command has no pertinent data associated with it, a check is made to determine whether a previous command is still buffered. In the event that there is no previous command still buffered, the command having no pertinent data is given a pointer in the buffer which prioritizes the order in which it is executed. On the other hand, if a previous command is still buffered, the command having no pertinent data is added to the still buffered previous command. A check is then made to determine whether the buffer if full, and if so, further command consolidation is delayed until such time that the highest priority command is executed. If the buffer is not full, a return is made to the input/output interface for receipt of further data and commands. Consolidation of such data and commands is thereafter resumed until the buffer is once again full.

DETAILED DESCRIPTION

Figure 1:
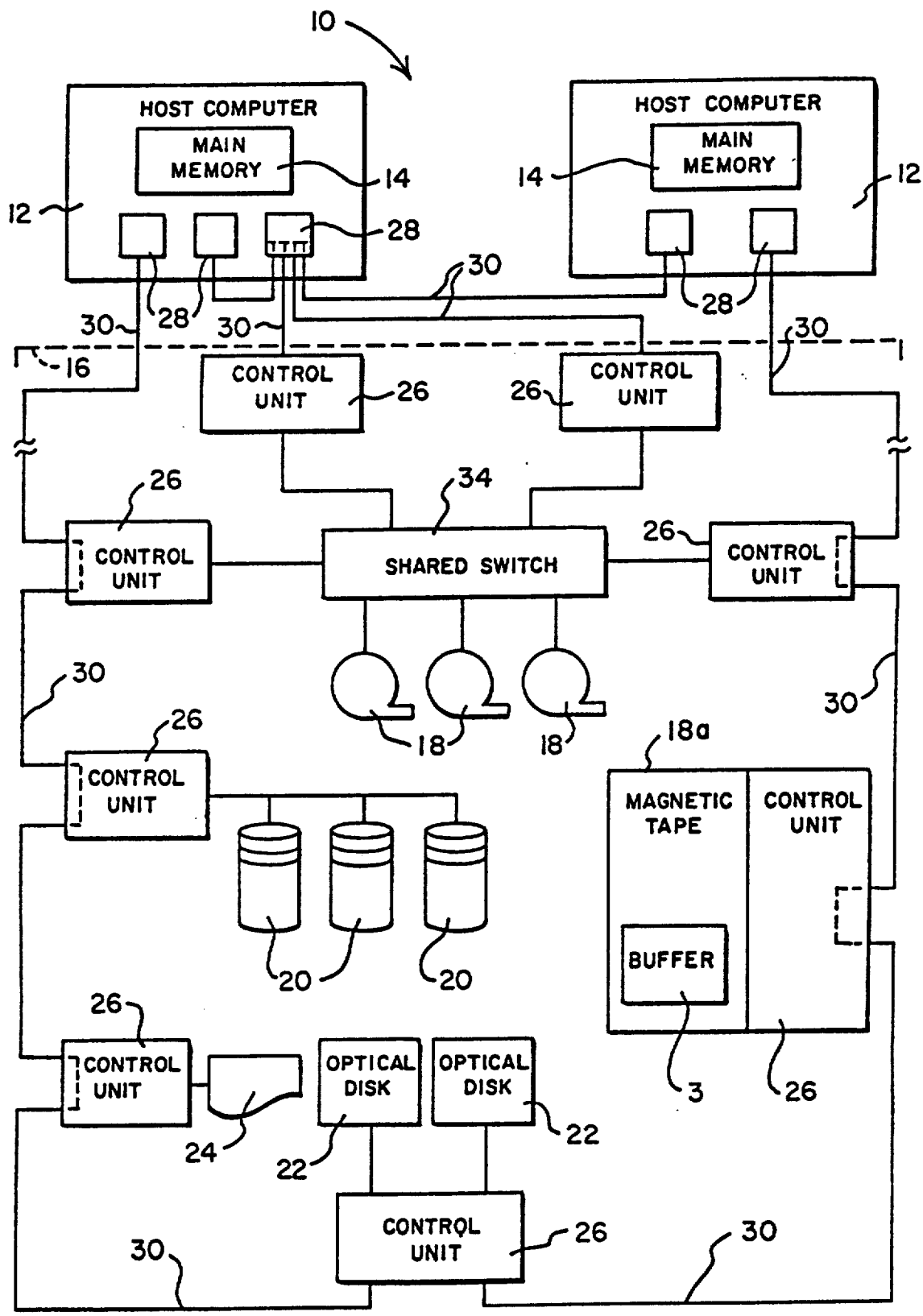
FIG. 1 is a block diagram of a data processing system incorporating an improved input/output device in accordance with the present invention.

Referring now to the drawings described above, wherein like characters designate like or corresponding parts throughout the several views, there is shown in FIG. 1 a conventional data processing system 10 which includes one or more host computers 12. As is well known, the host computer 12 includes main memory 14 and is connected to a plurality of input/output devices. One or more of the plurality of input/output devices are used as secondary memory in the form of magnetic tape drive 18, 19, magnetic disk drive 20, or optical disk drive 22, while other ones of the plurality of input/output devices are used as peripheral devices such as printer 24.

One or more control units 26 provide the logical capability necessary to operate and control an associated input/output device, are also included within the data processing system 10. In order to direct the flow of information among the control units 26, the main memory 14, and the input/output devices (such as printer 24), the data processing system 10 further includes a plurality of channel interface units 28 which connect the control units 26 through conventional input/output channels 30. As so configured, the control units 26 adapt the characteristics of the associated input/output devices to a standard form of control provided by the channel interface units 28.

Further details regarding a typical input/output channel 30, as well as a general description of such host computers 12, input/output devices, control units 26, and channel interface units 28 as they are used in a conventional data processing system 10, may be found in the Sixth Edition of "IBM System/360 and System/370 I/O Interface Channel to Control Unit Original Equipment Manufacturers' Information", which was published as GA22-6974-5 in February 1981 by the International Business Machines Corporation, and is incorporated herein by reference.

Conventional control units 26 decode commands received from the host computer 12 through channel interface units 28, interpret the commands for their assigned one of the plurality of input/output devices, and provide a signal sequence for execution of the operation to be carried out by the commands. However, because of the great difference in operational speeds that exist between typical host computers 12 and certain types of input/output devices, such as the magnetic tape drive 19, those input/output devices are most often provided with a buffer 32 in order to temporarily store the data and commands which are input thereto from the host computer 12.

The data and commands that are temporarily stored in the buffer 32 usually enter and exit buffer 32 on a "first-in-first-out" basis. Accordingly, the magnetic tape drive 19 is also referred to as a "buffered input/output device". One problem that exists with typical buffered input/output devices, well known to those of ordinary skill in the art, is their usual display of a lack of operational efficiency. That is, data and commands received from the host computer 12 by the buffer 32 within the magnetic tape drive 19 exit the buffer 32 in the very same order that they enter. As is most readily apparent, therefore, when a particular command in a sequence of commands could be carried out more efficiently out of order, the magnetic tape drive 19 would be unable to detect the potential for such increase in efficiency. Furthermore, the magnetic tape drive 19 would be unable to rearrange the sequence of commands in order to carry out the more efficient operation.

Figure 2:
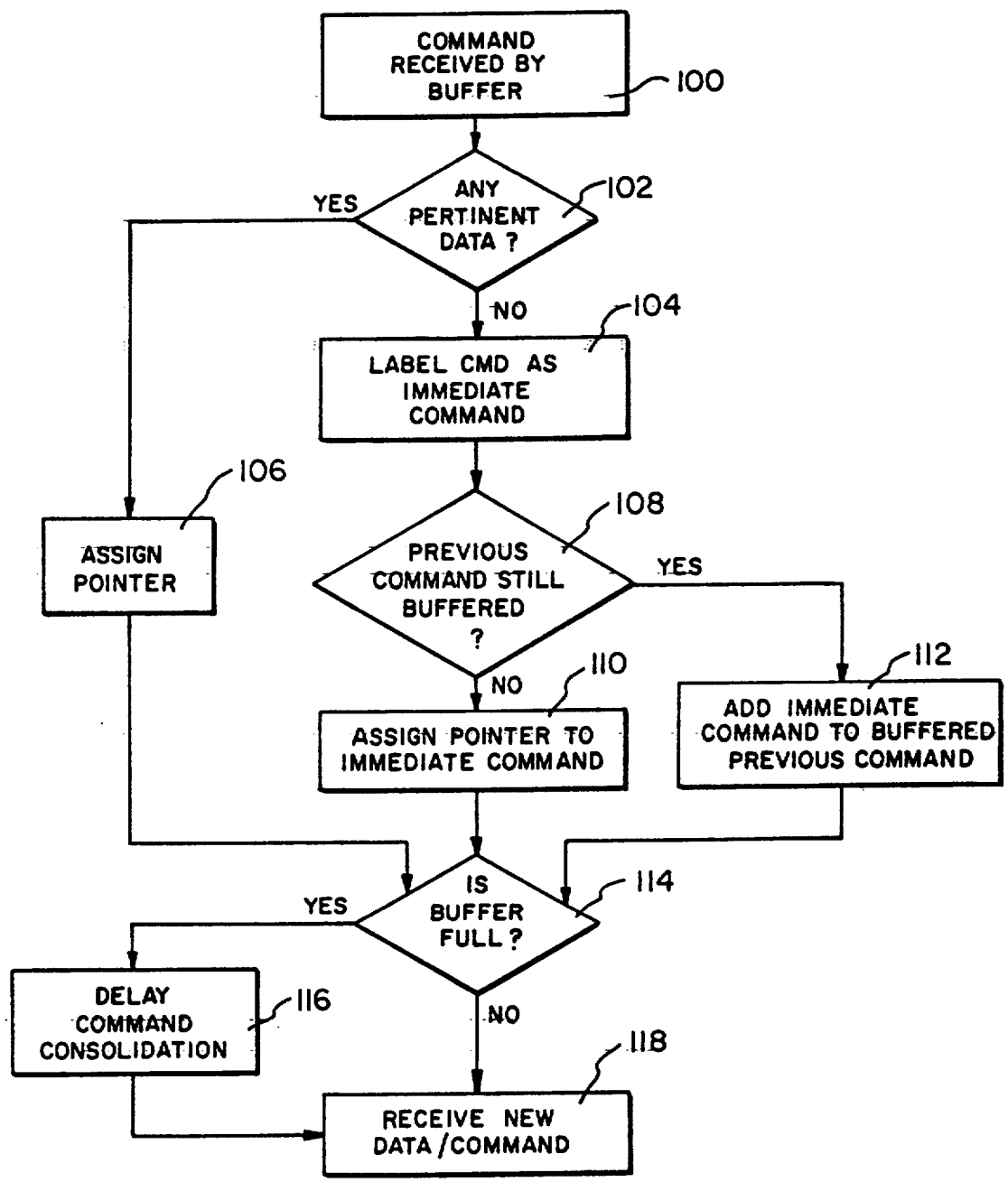
FIG. 2 is a simple flow diagram of a method, by command consolidation, for increasing operational efficiency of the data processing system shown in FIG. 1.

Referring now also to FIG. 2, therefore, a method for increasing the operational efficiency of the data processing system 10 shown in FIG. 1 by consolidation of commands from the host computer 12 to the magnetic tape drive 19 is explained with resort to the simple flow diagram illustrated therein. Each command (and any data associated with such command) received at step 100 by the buffer 32 from the host computer 12 over the channel interface unit 28 and input/output channel 30 is checked at step 102 to determine whether that command has any pertinent data such as output data for the associated recording medium. If such check reveals that there is no pertinent output data associated with the checked command, that command is labeled at step 104 as an immediate command. If the checked command does include output data, it is given a pointer at step 106 in buffer 32, such pointer assigning a priority to the order in which the command is executed.

Once a command is labeled at step 104 as an immediate command, a determination is made at step 108 of whether a previous command is still buffered within buffer 32. In the event that no previous command is still buffered, as determined at step 108, the checked command is given a pointer at step 110 in buffer 32 which prioritizes the order in which the command is executed. On the other hand, if a previous command is still buffered within buffer 32, the checked command that was labeled as immediate is incorporated into the still buffered previous command at step 112. A check is then made at step 114 to determine whether buffer 32 is full, and if so, further consolidation of the commands received from the host computer 12 is delayed at step 116 until such time that the highest priority command is executed. Thereafter, consolidation of such data and commands is resumed until such time that buffer 32 is once again full.

As is readily apparent from the above, the operational efficiency of the data processing system 10 utilizing the magnetic tape drive 19 with a buffer 32 receiving and processing data and commands in accordance with the present invention is increased by the consolidation of commands which rearranges the priority of execution based upon the presence or absence of output data, or upon the presence or absence of a previously prioritized command within buffer 32. It should be noted at this juncture, however, that while a method of command consolidation has been shown with reference to its incorporation in a magnetic tape drive 19, such method of command consolidation may be equally utilized in other ones of the plurality of input/output devices 16 shown in FIG. 1 without departing from the true spirit and scope of the present invention. The method as described thus far merely requires the presence of a buffer 32 within such input/output devices 16.

Figure 3:
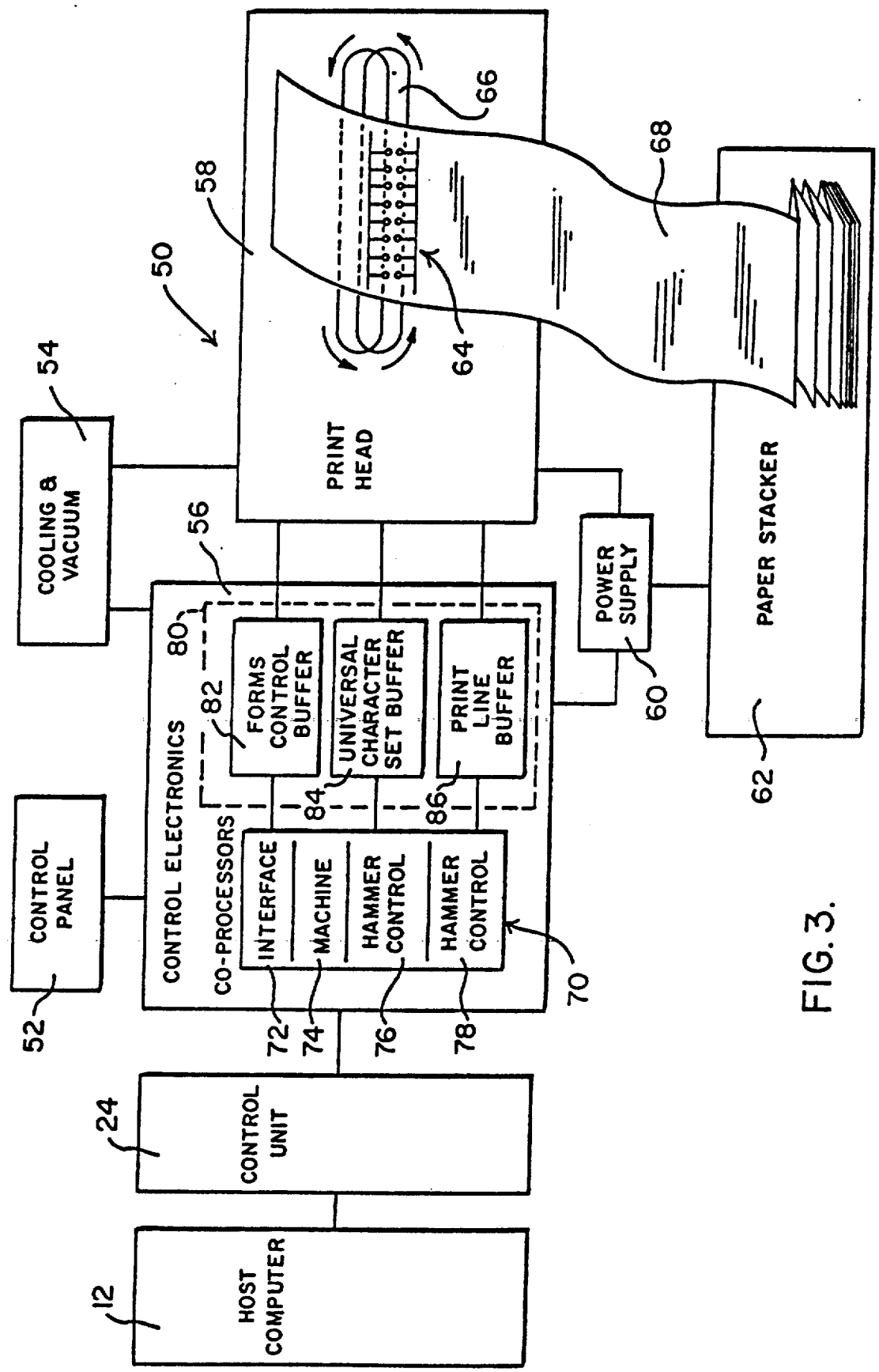
FIG. 3 illustrates, in block diagram format, an improved high-speed impact printer utilized within a data processing system including a host computer.
Figure 4:
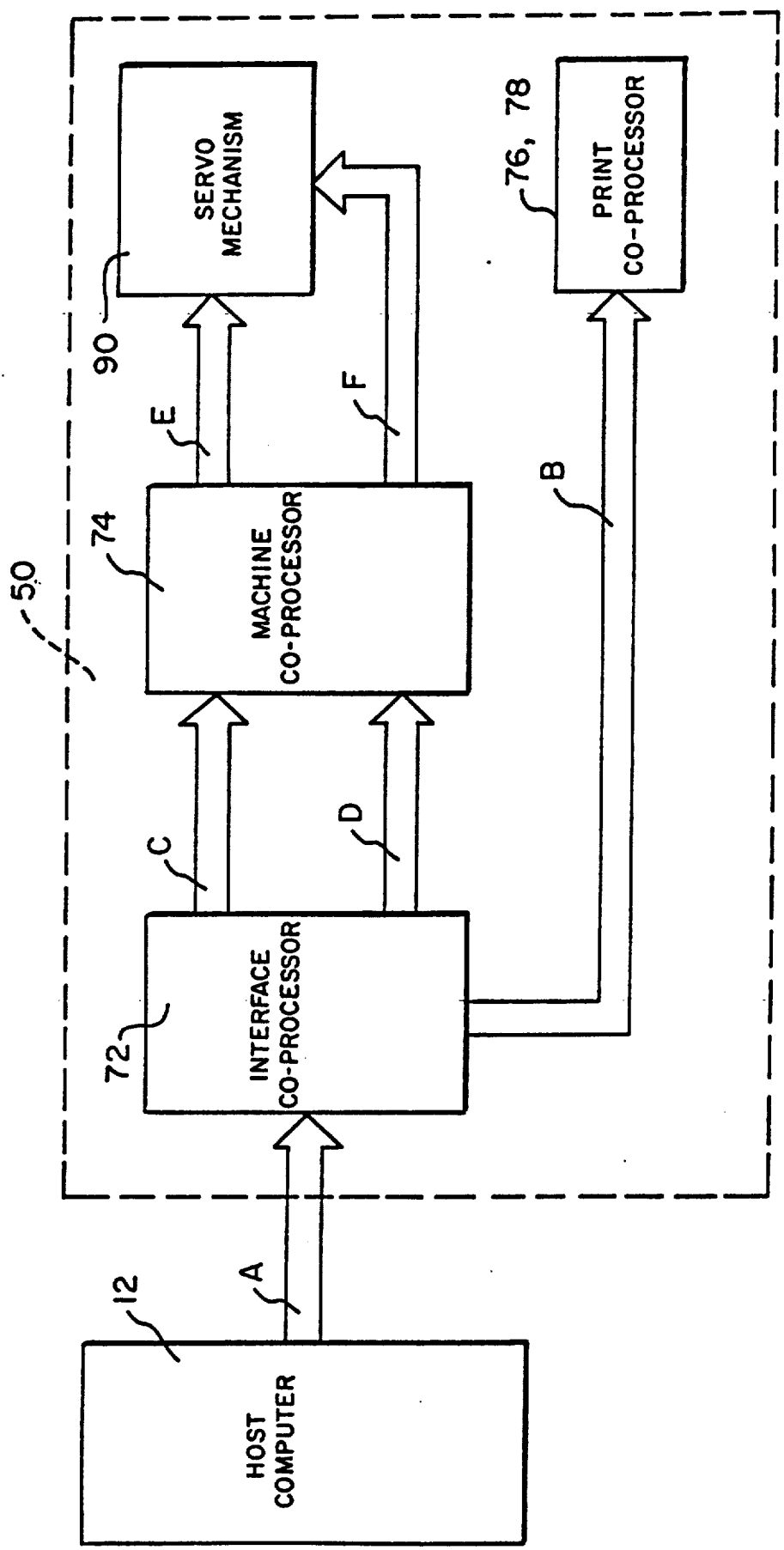
FIG. 4 diagrammatically illustrates data and command flow within the printer shown in FIG. 3.
Figure 5:
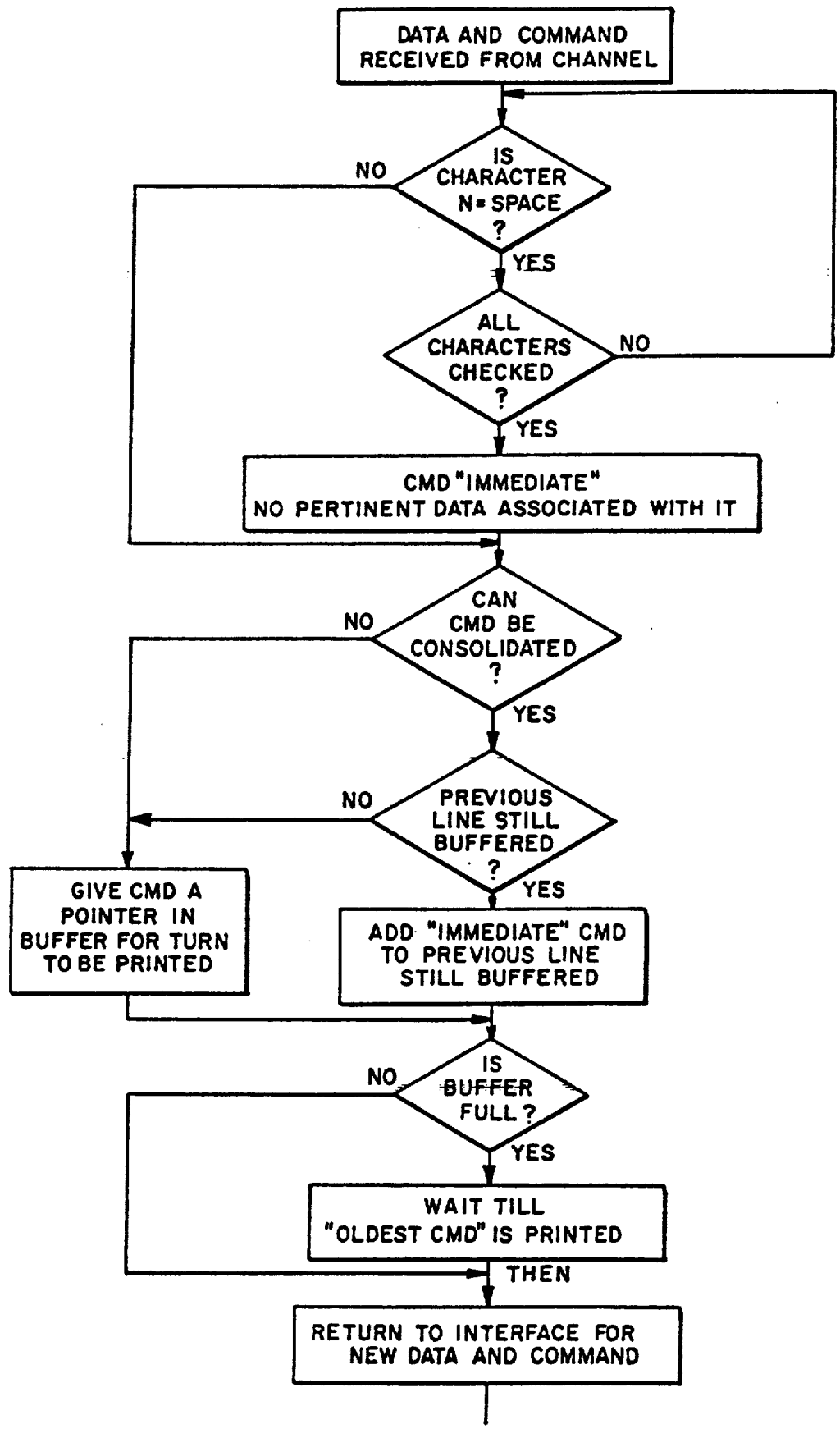
FIG. 5 is a flow diagram of a method of consolidating commands, and data associated with such commands, received by the printer from the host computer as illustrated in FIGS. 3 and 4.

In accordance with a preferred embodiment of the present invention, and referring now to FIGS. 3-5, a method and apparatus is explained for consolidation of commands received by printer 24 (FIG. 1), such as a high-speed impact printer 50, from its host computer 12 in a typical data processing system 10. As shown in FIG. 3, the printer 24 is connected to the host computer 12 by the input/output channel 30, and control unit 26. Printer 24 generally comprises a control panel 52, cooling and vacuum apparatus 54, control electronics 56, print head 58, power supply 60, and paper stacker 62.

One high-speed impact printer that is particularly suitable for the implementation of the printer 24 is manufactured by the assignee of the present invention as the StorageTek Printer Corporation "Impact 5000 Series" high-speed line printer. In such printers, the print head 58 includes a plurality of coil-operated hammers arranged in two hammerbanks 64. A print band 66 contains two rows of 576 etched graphics, each in various arrays, and rotates at a constant speed directly in front of the hammerbanks 64. The characters on the print band 66 are, thus, successively presented to each hammer for selective printing in the following manner.

An associated striker coil (not shown) is energized by a signal from hammer fire control circuits in the control electronics 56. The striker armature forces a pushrod forward, together with its associated hammer. That hammer subsequently drives the forms 68 and a conventional towel ribbon (also not shown) against the raised character on the print band 66 to print the selected character. Further details regarding the particular manner in which such conventional high-speed impact printers operate, not necessary for a complete understanding of the present invention, may be found in the following Impact ® 5000 Series manuals of the StorageTek Printer Corporation, each of which are incorporated herein by reference: "Product Description Manual" —EP 026-0, "Operators Manual"—PN 3800014171, "Maintenance Manual"—PN 3800014131, "Theory Manual"—PN 3800014155, "Interface Manual"—PN 3800014159.

As discussed briefly herein above, selected operation of the hammers for printing is accomplished by the control electronics 56. Conventional highspeed impact printers typically use a plurality of coprocessors 70 in order to carry out such control. In the aforementioned Impact ® 5000 Series printers, four such co-processors 70 are employed: an interface coprocessor 72 which decodes commands from the host computer 12 regarding data that is to be printed, a machine co-processor 74 which functions as the interfacing and coordinating processor between the interface co-processor 72 and significant printer functions, and a hammer co-processors 76, 78 one for each hammerbank 64. The control electronics 56 in such Impact ® 5000 Series printers also includes a conventional shared memory 80 and a dual floppy disk drive (not shown), as well as a bus for communication between the co-processors 70.

In the shared memory 80, the interface coprocessor 74 maintains a forms control buffer 82, a universal character set buffer 84 and a print line buffer 86. The forms control buffer 82, consisting of vertical format information for the advancement of forms through the printer 24 by a servo mechanism 90 (FIG. 4), is built up from information received from the host computer 12 by the interface co-processor 72, the interface co-processor 72 thereafter calculating and scheduling such information along with output data for a print line buffer 86 to ensure proper forms control. Information relating to the universal character set buffer 84 is also obtained from the host computer 12, and is maintained in a storage area to be available for subsequent read commands.

The machine co-processor 74 manages the print line buffer 86 by advising the interface co-processor 72 when an available print line buffer location exists. Moreover, the machine co-processor 74 is responsible for the execution of commands resident in a command stack (not shown). The machine co-processor 74, thus, determines which hammerbank 64 should be used to print output data stored in print line buffer 86 and assigns each command accordingly, prepares a print schedule, then assigns output data stored in print line buffer 86 to the appropriate hammer coprocessor 76, 78, and directs forms advance by informing the servo mechanism 90 in the forms advance system the particular number of lines to move in order to keep the form 68 properly aligned with the print data.

Data and command flow within the printer 24 shown in FIG. 3 will now be described with reference to FIG. 4. As is shown therein, information A relating to a particular printing operation is relayed to the printer 24 from the host computer 12 in the form of pertinent (i.e., "printable") and non-pertinent (e.g., spaces) data, print commands or carriage control commands. Such information A is received by the interface co-processor 72, and is checked for any nonpertinent data.

If the information A contains pertinent, printable data with a "move" command for the servo mechanism 90, such pertinent data with the move command is buffered in memory 80. On the other hand, if the information A contains no data but includes a move command, that command is referred to as a "command immediate" which is added to the last buffered data or command. Where non-pertinent data (e.g., all spaces) is forwarded with a move command, the interface co-processor 72 identifies such nonpertinent data, discards that data, thereby changing the received command and data to a move command. Interface co-processor 72 forwards the resultant move command to the machine co-processor 74 in the form of changed or consolidated commands C. Any unmodified commands D for carriage control such as move commands appended to non-pertinent or zero data are forwarded to the machine co-processor 74, while the pertinent and printable output data B is forwarded from the interface co-processor 72 to the hammer control coprocessors 76, 78.

When any printing operations are thereafter scheduled by the machine co-processor 74, the printer 24 prints the pertinent output data and performs one consolidated move. That is, the move commands from any commands immediate that were added to buffered pertinent data with a move command are consolidated as a single move command after such pertinent output data is printed, such consolidated move commands E being forwarded from the machine co-processor 74 to the servo mechanism 90. On the other hand, the unmodified carriage control commands D are sent to the servo mechanism 90 without consolidation by the machine co-processor 74 as commands F.

Such command consolidation, as well as the advantages of printer efficiency that are achieved thereby will be illustrated in greater detail with reference to FIGS. 3-5 and the exemplary tables listed below.

TABLE I

| Interface Transmission | | | | | Printer Action |
|---|---|---|---|---|---|
| A, | A, | A, | A, | SPACE 1 | Buffered and given pointer #1 |
| , | , | , | , | SPACE 1 | Buffered and given pointer #2 |
| , | B, | B, | , | SPACE 3 | Buffered and given pointer #3 |
| | | | | SPACE 1 | Buffered and given pointer #4 |
| , | , | , | , | SPACE 2 | Buffered and given pointer #5 |
| C, | C, | C, | , | SPACE 1 | Buffered and given pointer #6 |

Table I shows six separate transmissions A (FIG. 4) that could be received from the host computer 12 by the control electronics 56 through control unit 26. As shown the first, third, and sixth transmission contain pertinent output data with move commands for the servo mechanism 90. The second and fifth transmissions illustrate non-pertinent data appended to a move command, while the fourth transmission illustrates zero data with a move command. What printer action occurs in response to such transmission under a presently practiced method of operating high-speed impact printers is also shown in Table I.

TABLE II

| Interface Transmission | | | | | Printer Action |
|---|---|---|---|---|---|
| A, | A, | A, | A, | SPACE 1 | Buffered and given pointer #1 |
| , | , | , | , | SPACE 1 | Add to pointer #1, now SPACE 2 |
| , | B, | B, | , | SPACE 3 | Buffered and given pointer #2 |

TABLE II-continued

| Interface Transmission | Printer Action |
|---|---|
| SPACE 1 | Add to pointer #2, now SPACE 4 |
| , , , , SPACE 2 | Add to pointer #2, now SPACE 6 |
| C, C, C, , SPACE 1 | Buffered and given pointer #3 |

Table II illustrates the same six transmissions A, and the subsequent printer actions that occur under the method according to the present invention. As is readily apparent, the second and fifth transmissions were labeled as commands immediate and appended to the last previously buffered pertinent output data and move command. Since the fourth transmission contained zero data, it too is labeled as a command immediate and is appended to the last previously buffered pertinent data and move command.

TABLE III

| Prior Art | | Command Consolidation | |
|---|---|---|---|
| Data | Movement | Data | Movement |
| AAAA | start | AAAA | start |
| | stop-start | | |
| BB | stop-start | BB | stop-start |
| | stop-start | | |
| | stop-start | | |
| CCC | stop-start | CCC | stop-start |
| | stop | | TBD |

Table III comparatively illustrates the subsequent printing operations and stop/start operations of the servo mechanism 90 when utilizing the two methods shown in Tables I and II. As is readily apparent, the command consolidation method according to the present invention not only significantly reduces the number of start/-stop movements of the servo mechanism 90 but also enables further consolidation of commands at the end of printer operations (i.e., at "TBD"—to be determined) rather than a complete stoppage of the servo mechanism.

A flow chart of the steps necessary to practice the method of command consolidation according to the present invention is shown in FIG. 5. As shown therein, information A in the form of a command and its associated data is received from the host computer 12 across the channel interface unit 28 at step 120. Each character in the associated data is checked to determine if it contains a space at step 122.

If all of the characters are spaces as determined at steps 122 and 124, the data contained within the information A is referred to as "non-pertinent" data, and the command associated with such data is labeled as a command immediate at step 126. Otherwise, if the character n is not a space, its associated command is checked to determine if that command can be consolidated at step 128. Such is the case if zero data with an appended move command were received across the channel interface unit 28.

If the command that was checked at step 128 can not be consolidated, then that command is given a pointer in the buffer from which its turn to be printed is determined at step 130. Otherwise, if the checked command was labeled as a command immediate, whether initially or as changed at step 126, a determination is then made at step 132 of whether a previous line of output data is still buffered. If not, the checked command is given at pointer at step 130. If so, however, the checked command is added to the previously buffered line of output data at step 134 without the necessity for assignment of its own pointer. This addition, thus, consolidates any move commands by appending them, to the previously buffered line of output data.

A check of the buffer to determine whether it is full is then made at step 136. If the buffer is full, a waiting period is invoked at step 138 until such time that the data that is associated with the oldest command (i.e., that command having the lowest numbered pointer) is printed, followed at step 140 by a return to the control unit 26 for a new command and data. If, on the other hand, the buffer is not full, an immediate return to the control unit 26 is made so that the servo mechanism 90 need not necessarily stop.

Obviously, many modifications and variations of the present invention are possible in light of each of the foregoing teachings. For example, such a method of command consolidation may be practiced in an input-/output device that incorporates a buffer. It is, therefore, to be understood that, within the scope of the appended claims, the present invention may be practiced otherwise than as specifically described herein without departing from the true spirit and scope thereof.

What we claim is:

1. In a data processing system which includes a host computer, a channel coupling said host computer to a line printer, and a buffer within said line printer for buffering commands received across said channel from said host computer, wherein said received commands optionally include a data field containing data to be output by said line printer, a method of consolidating said commands in said line printer comprising the steps of:

checking each said command received by said buffer to determine whether it includes output data for said line printer;

assigning a pointer in said buffer to each said command not having output data associated therewith that is received prior to a command having output data associated therewith, each subsequent said command not having output data associated therewith that is received prior to said command having output data associated therewith being assigned a pointer lower in priority than the pointer assigned to an immediately previously buffered command not having output data associated therewith;

assigning a pointer in said buffer to a first of said received commands having output data associated therewith, said pointer assigned to said first received command being lower in priority than the pointer assigned to said immediately previously buffered command not having output data associated therewith;

combining each said check command not having output data with said first command;

printing said output data; and executing said combined commands.

2. The method according to claim 5, further comprising the step of checking said buffer to determine whether it is full.

3. The method according to claim 2, further comprising the step of delaying said combining step if said buffer is full.

4. A method of improving efficiency of a buffered input/output device that is connected to a host computer, said buffered input/output device receiving a plurality of commands, each of said received commands optionally including a data field that contains data to be output by said input/output device, from said host computer across a channel, wherein said method comprises the steps of:

checking each said received command to determine whether it includes output data for said input/output device;

assigning a priority to a first of said checked commands having output data associated therewith;

appending the next one of said commands, received subsequent to said step of assigning, to said first command when said next received command does not include output data; and assigning a priority lower than said priority assigned to said first checked command to the next subsequent check command having output data associated therewith.

5. In an input/output device that is connected to an associated data channel for recording data received from said data channel, apparatus for consolidating a plurality of commands received from said data channel, wherein each said received command optionally includes a data field that contains data for recording by said input/output device, comprising:

means for storing each said command received from said data channel;

means for checking said received command to determine whether it includes data for recording by said input/output device;

means for assigning a priority to a first of said checked commands having output data associated therewith;

means for determining whether said storing means contains a previously received command stored therein; and means for combining said previously received command and said received command if said received command does not include data for recording by said input/output device;

means for assigning a priority lower than said priority assigned to said first checked command to the next subsequent checked command having output data associated therewith.

6. The apparatus of claim 5 further comprising:

means for determining whether said storing means is full; and means responsive to said determining means for disabling the operation of said combining means while said storing means is full.

7. The apparatus of claim 9 further comprising:

means for executing said stored commands in order of said assigned pointer priority value.

* * * * *